Figures 1, 2:
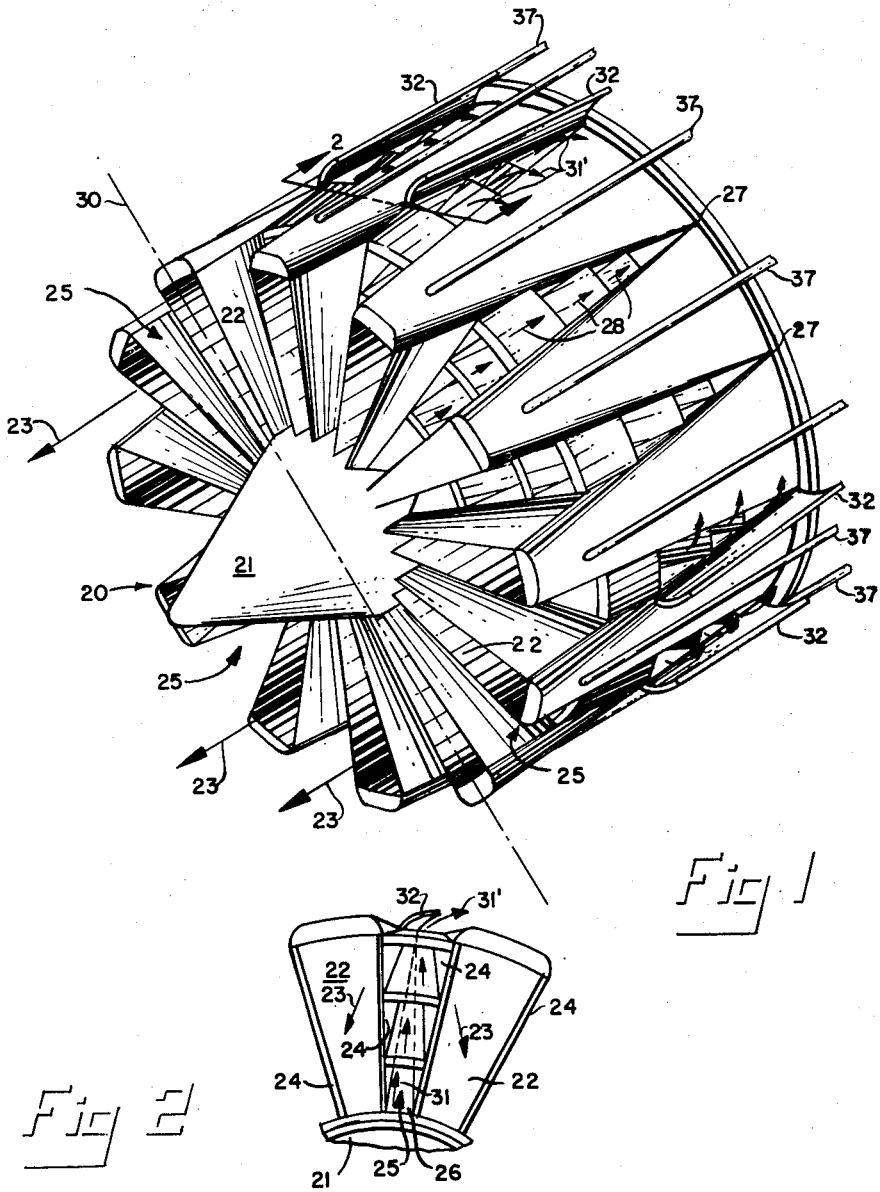

July 6, 1965 J. BAIRD 3,192,713
COMBINED THRUST REVERSAL AND SOUND REDUCTION NOZZLE
Filed March 21, 1958 8 Sheets-Sheet 1

INVENTOR.
JOHN BAIRD

BY
ATTORNEY

July 6, 1965 J. BAIRD 3,192,713
COMBINED THRUST REVERSAL AND SOUND REDUCTION NOZZLE
Filed March 21, 1958 8 Sheets-Sheet 2

INVENTOR.
JOHN BAIRD
BY
ATTORNEY

July 6, 1965           J. BAIRD           3,192,713

COMBINED THRUST REVERSAL AND SOUND REDUCTION NOZZLE

Filed March 21, 1958          8 Sheets-Sheet 3

INVENTOR.
JOHN BAIRD
ATTORNEY

July 6, 1965  J. BAIRD  3,192,713
COMBINED THRUST REVERSAL AND SOUND REDUCTION NOZZLE
Filed March 21, 1958  8 Sheets-Sheet 4

INVENTOR.
JOHN BAIRD
BY D. Gordon Angus
ATTORNEY

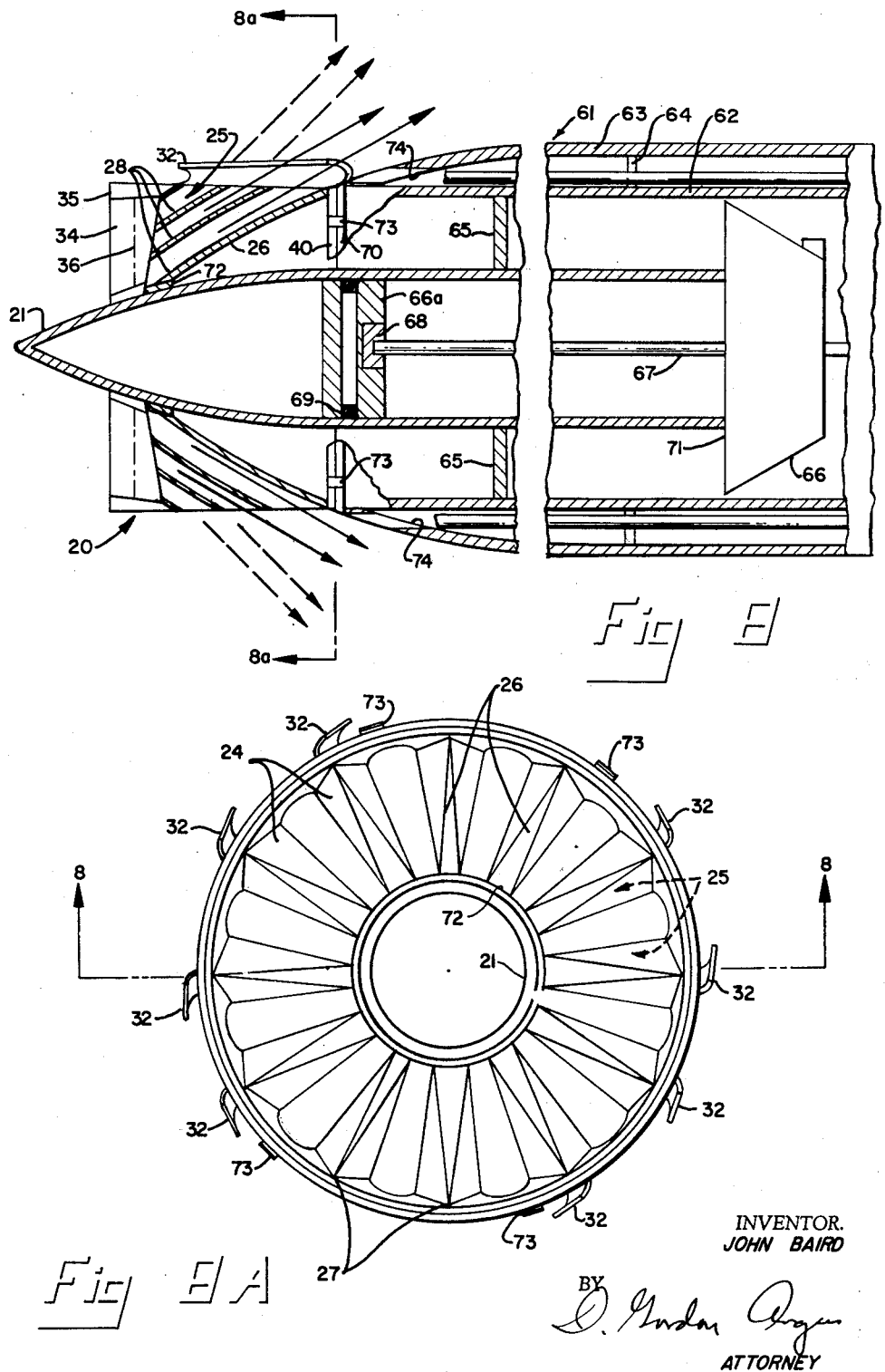

July 6, 1965   J. BAIRD   3,192,713
COMBINED THRUST REVERSAL AND SOUND REDUCTION NOZZLE
Filed March 21, 1958   8 Sheets-Sheet 6

INVENTOR.
JOHN BAIRD
BY
ATTORNEY

July 6, 1965

J. BAIRD 3,192,713

COMBINED THRUST REVERSAL AND SOUND REDUCTION NOZZLE

Filed March 21, 1958

8 Sheets-Sheet 7

INVENTOR.
JOHN BAIRD

BY
ATTORNEY

July 6, 1965  J. BAIRD  3,192,713
COMBINED THRUST REVERSAL AND SOUND REDUCTION NOZZLE
Filed March 21, 1958  8 Sheets-Sheet 8

INVENTOR.
JOHN BAIRD
BY
D. Gordon Angus
ATTORNEY 3,192,713
COMBINED THRUST REVERSAL AND SOUND REDUCTION NOZZLE
John Baird, Fair Oaks, Calif., assignor to Aerojet-General Corporation, Azusa, Calif., a corporation of Ohio
Filed Mar. 21, 1958, Ser. No. 723,022
6 Claims. (Cl. 60—35.54)

This invention relates to jet engine nozzles and, more particularly, to nozzle structure for reversing the direction of the thrust effect of exhaust gas flow from such a nozzle.

An object of the invention is to provide structure for reversing the thrust producing gas flow from a jet engine in an efficient manner.

A related object is to provide a silencing of the reverse thrust exhaust gas flow, as well as of the exhaust gas flow which produces forward thrust.

Jet engine nozzle structure with a central plug and channels which channelizes the exhaust gas has heretofore been proposed for reducing noise emitted by a jet engine nozzle. Difficulty in effectively reversing the exhaust gas flow to provide a reversed braking thrust has, however, been encountered with such a jet engine nozzle; and, because of this, the efficiency obtained in reversing of exhaust gas has heretofore not been very satisfactory in this type of nozzle structure. No structure was known which was sufficiently an integral part of other required nozzle structure to reduce use of space to a minimum. Thrust reverse structure generally was comparatively heavy and massive in comparison and required a complicated multiple positioning type of actuation. An adjustable engine aft or base fairing was generally required to provide for gas flow access during actuation of the reverser. The thrust reverser structure interfered with the secondary cold air flow of the atmosphere from around the engine, which joins the periphery of the exhaust gas during operation of the exhaust gas flow for forward thrust. Even if the thrust reverser structure did not interfere, it sometimes was excessively heavy and complicated in order to avoid such interference. The silencing features and other advantages of such a channelized nozzle having a central plug were not preserved during thrust reverse operation due to a substantial change in the diffused exit pattern of the exhaust gas flow obtainable for forward thrust operation. Auxiliary actuated surfaces were sometimes required to prevent impingement of the reverse gas flow on adjacent surfaces of the engine, or airplane, or the like.

The reverse gas flow turning angle was generally made to be a function of the engine power setting, resulting in lack of suitable control under some circumstances of operation due to an ascertained engine power setting. High reverse jet velocities and relatively high temperatures at short distances from the reverse gas flow exit were encountered, resulting in picking up debris from the aircraft runway and heating adjacent aircraft structure unduly.

The foregoing numerous difficulties encountered with known types of channelized central plug type jet nozzles for noise silencing obviously left much to be desired in the way of providing such a nozzle having a thrust reversing structure operable in an overall efficient manner.

A feature of this invention resides in thrust reversing structure comprising movable gates which each form a part of a wall of an individual gas flow channel during forward thrust operation, and which each form gas flow turning surfaces for directing exhaust gas flow in a reverse direction between adjacent pairs of the same individual gas flow channels during reverse thrust operation.

Figure 3:
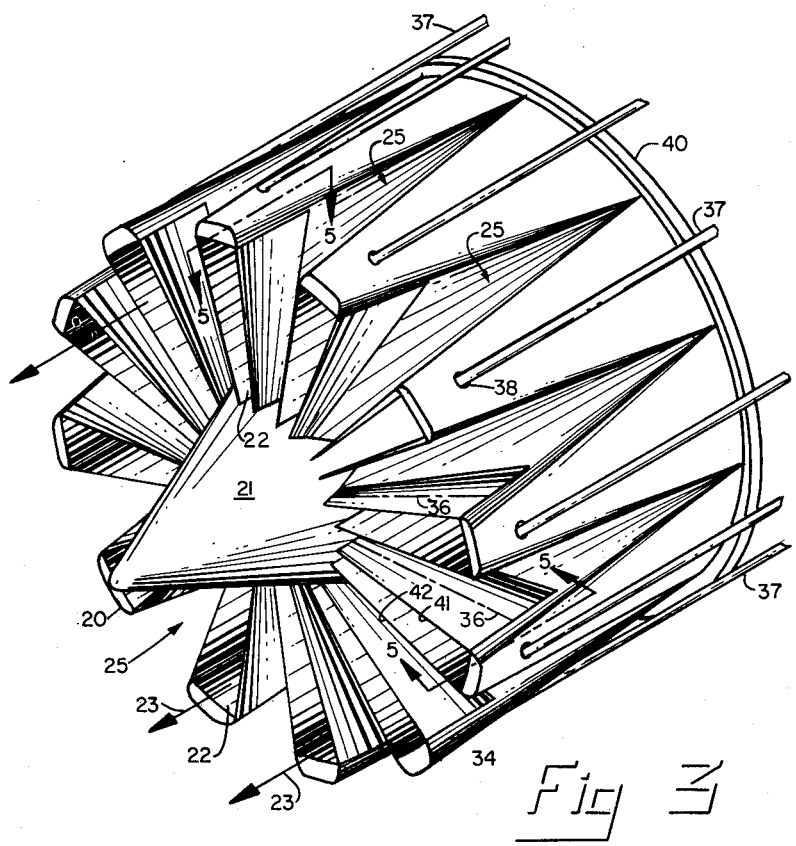
Figure 5:
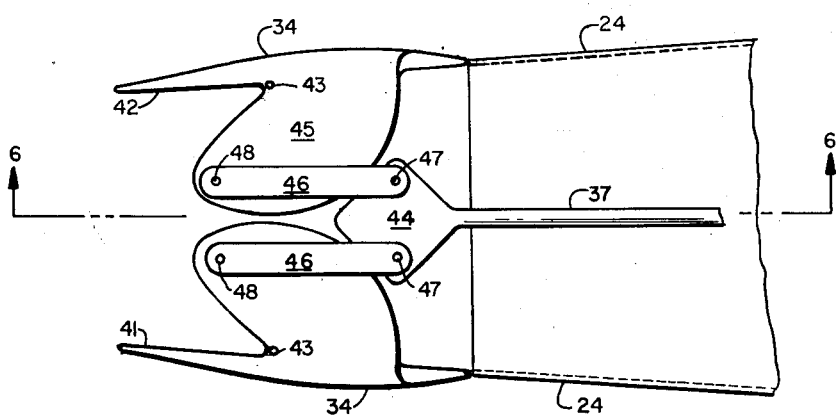
Figure 4:
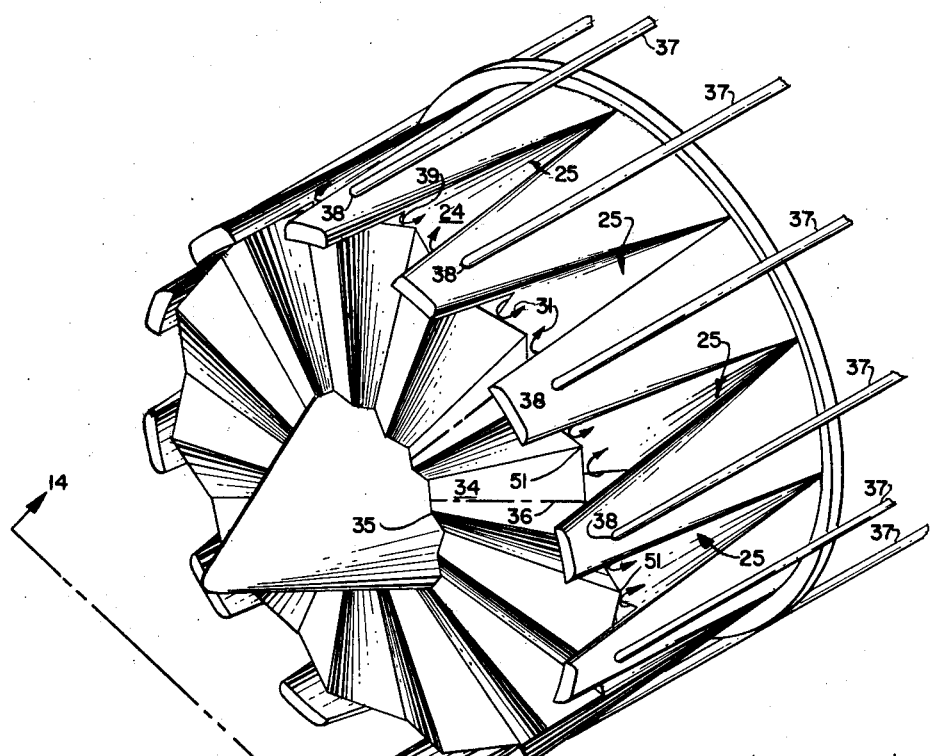
Figure 7:
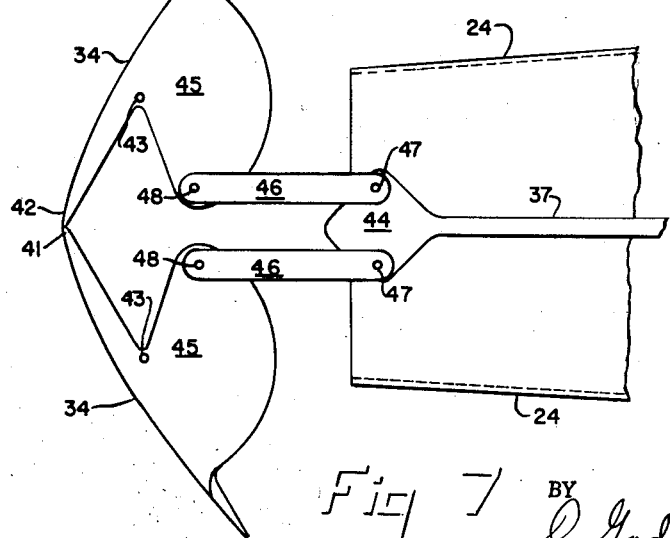
Figure 6:
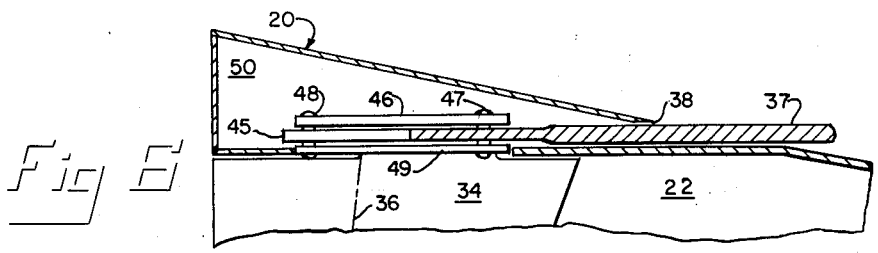
Figure 9:
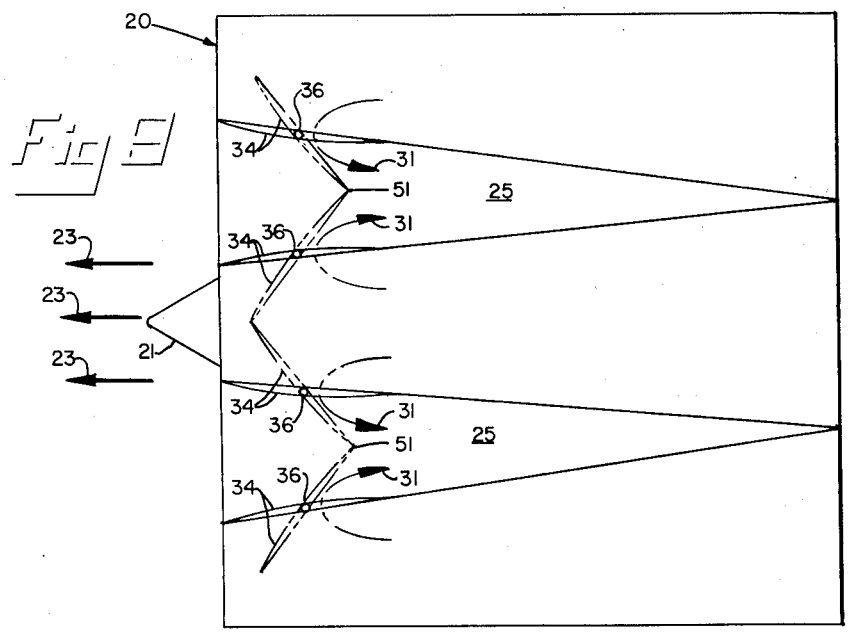
Figure 10:
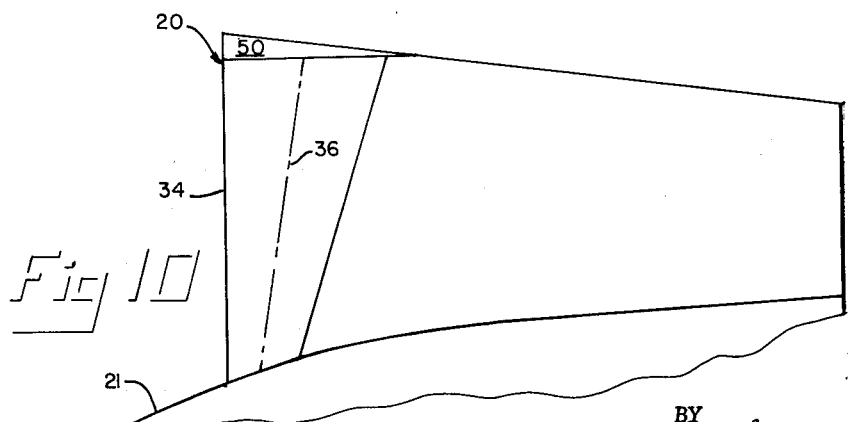
Figure 11:
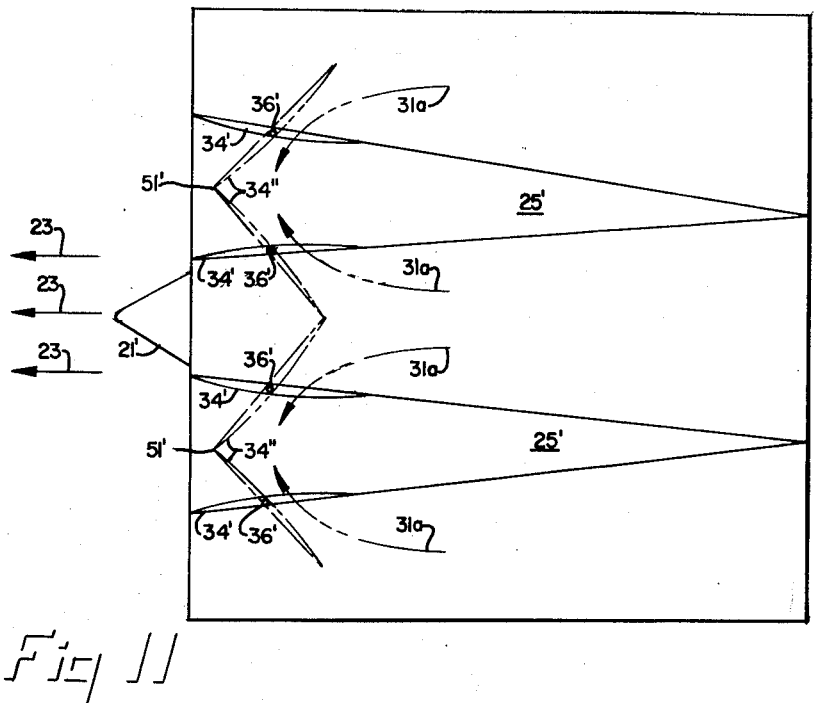
Figure 12:
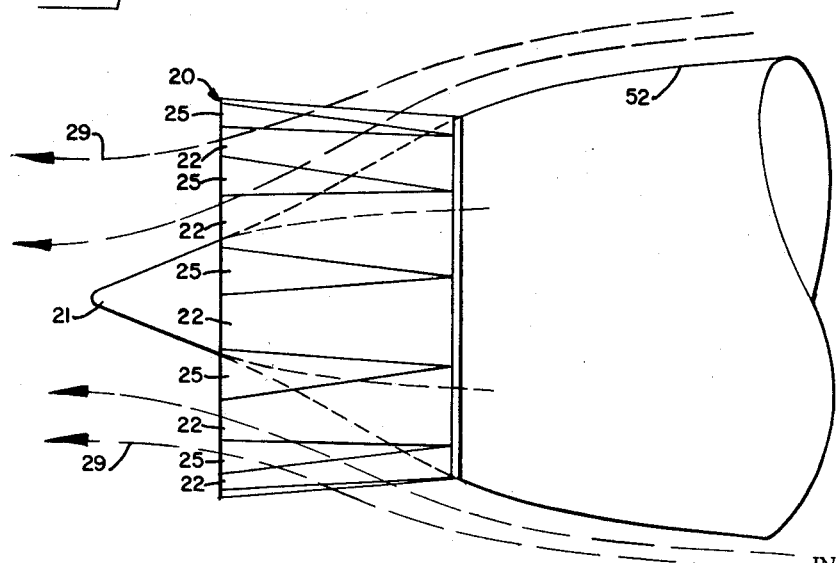
Figure 13:
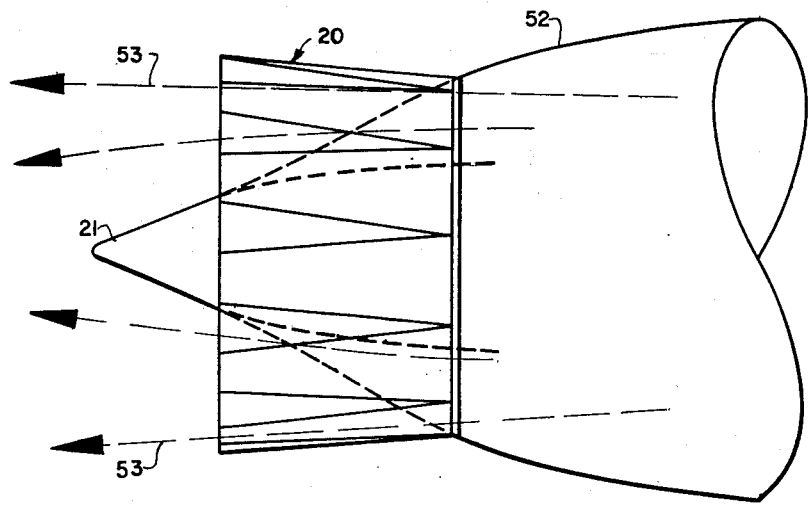
Figure 14:
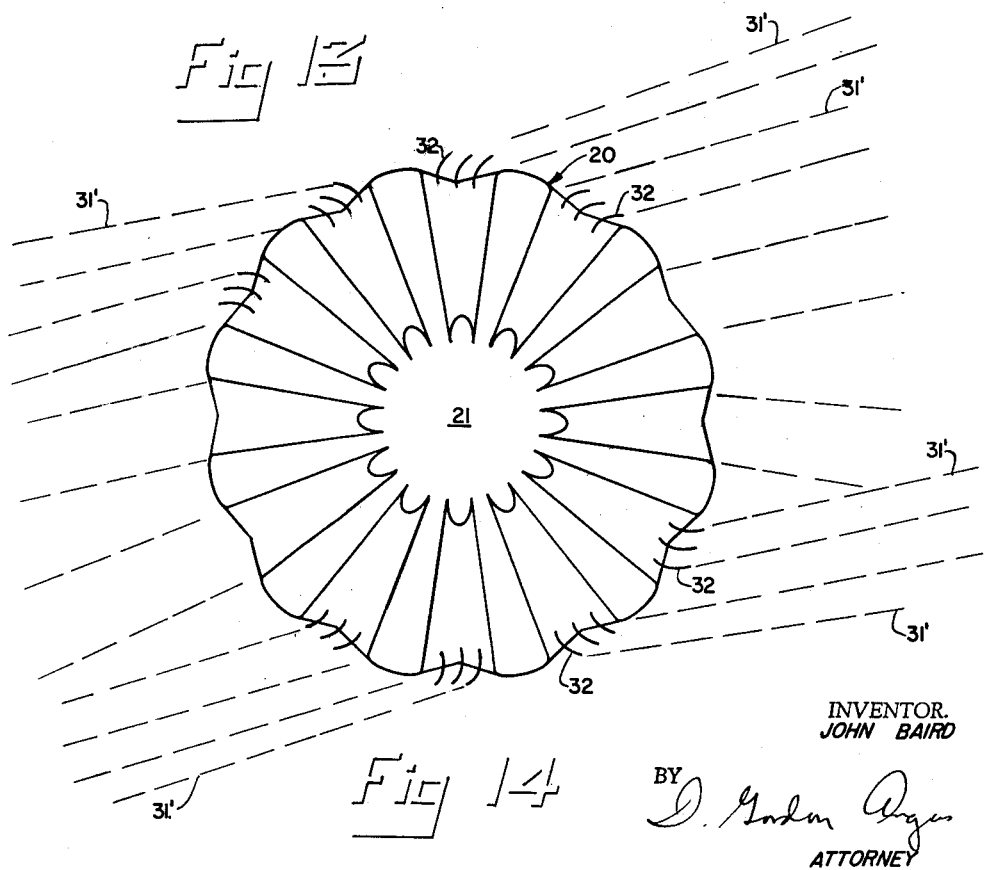
Figure 15:
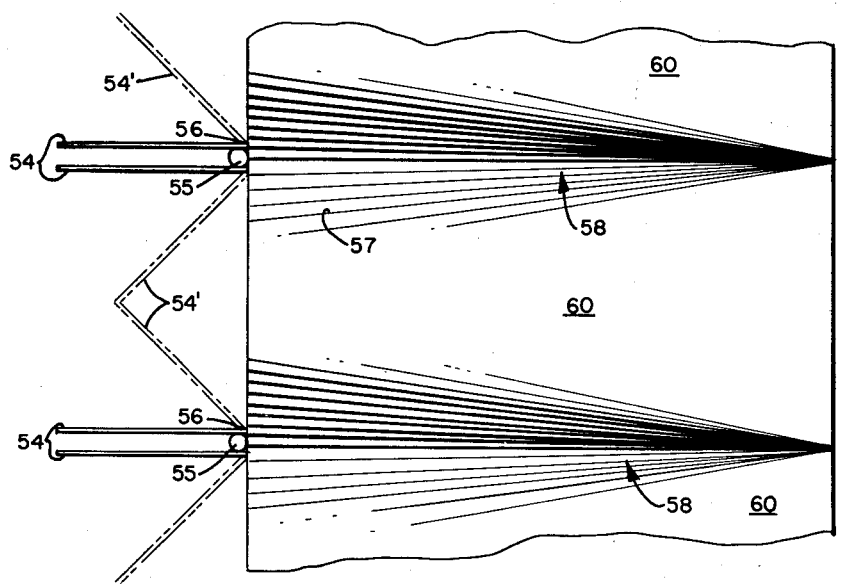
Figure 16:
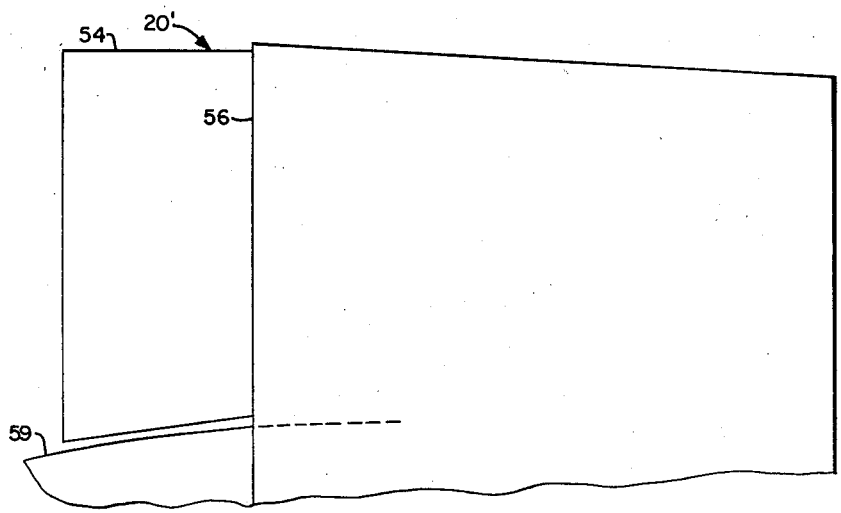

The foregoing and other features will be fully understood from the following detailed description and accompanying drawings of which:

FIG. 1 shows a perspective view of a jet engine nozzle structure according to the invention;
FIG. 2 shows a fragmentary cross section taken at line 2—2 in FIG. 1;
FIG. 3 shows a portion of the structure of FIG. 1 in one position of operation;
FIG. 4 shows the structure of FIG. 3 in another position of operation;
FIG. 5 shows an enlarged fragmentary cross section taken at line 5—5 in FIG. 3;
FIG. 6 shows a cross section taken at line 6—6 in FIG. 5;
FIG. 7 shows the structure of FIGS. 5 and 6 in the FIG. 4 position of operation;
FIG. 8 shows a fragmentary cross section of a jet engine nozzle structure according to the invention attached to tailpipe of a jet engine;
FIG. 8A shows a cross section taken at line 8a—8a in FIG. 8;
FIG. 9 shows a fragmentary "top" view of a schematic gas flow diagram of the structure of FIGS. 1 to 8;
FIG. 10 shows a fragmentary "side" view of the structure represented in the FIG. 9 schematic drawing;
FIG. 11 shows a fragmentary "top" view of a schematic gas flow diagram in which an optional method of operation of the structure of FIGS. 1 to 10 is represented;
FIG. 12 shows schematically the secondary air flow pattern of the structure of FIGS. 1 to 11;
FIG. 13 shows schematically the primary air flow pattern of the structure of FIGS. 1 to 11;
FIG. 14 shows schematically, in a view taken at line 14—14 in FIG. 4, the reverse gas flow pattern of the structure in FIGS. 1 to 13 when it is in the FIG. 4 position of operation;
FIG. 15 is a "top" view showing an optional construction of a portion of the structure shown in FIGS. 5 to 7; and
FIG. 16 is a "side" view of the structure shown in FIG. 15.

In FIG. 8 there is shown a fragmentary cross section view of a jet engine 61 having a tubular tailpipe 62 preferably surrounded by a streamlined cowling 63. The cowling 63 may be held in a desired position away from the tailpipe 62 by a suitable plurality of braces 64 between these two members. The tailpipe 62 has a central plug 21 which is preferably hollow and which is of a metal able to withstand the intense heat within the tailpipe. The central plug 21 is held in a central position by a suitable plurality of braces 65 which are narrow so as not to impede appreciably the flow of gases through the tailpipe. The central plug braces are also of a suitable metal material which is able to withstand conditions of operation in the tailpipe. The braces 64 and 65 may be welded to either or both of the two respective members which each of them separate, or they may be attached by any other suitable detachable or non-detachable means as may be desired.

The tailpipe 62 contains an engine turbine 66 mounted upon a centrally disposed rotatable shaft 67 which also has mounted on it, a jet engine air compressor (not shown) forward of the turbine 66. The shaft 67 extends from a position forward of the turbine 66 to a position within a bearing 68 rearward of the turbine and within the central plug 21. The plug 21 extends to the turbine 66. The bearing 68 is held in a central position within the plug 21 by suitable metal bracing means 66a extending and attached to the inner walls of plug 21. The bracing means 66a is positioned longitudinally within the plug 21 by an internal flange 69 which is attached to the plug. It is to be understood that the longitudinal position of the bearing 68 within the plug 21 depends on the shaft length, and that it may be positioned in some convenient location where the structural attachments may be conveniently made. The central plug 21 may, if desired, be fabricated from several sections for simplicity of manufacture. The rearward end of the central plug is preferably conical in shape as shown in FIG. 8. The tailpipe 62 has an end flange 70 at its rearward end, which flange 70 extends around the periphery of the tailpipe.

Positioned on the aft end of the jet engine tailpipe 62 is a jet engine nozzle 20 constructed according to the invention. The nozzle 20 surrounds the centrally disposed plug 21, which plug serves as a base fairing at the plug circumference 71 for hot exhaust gases emitted by rearward wheels of the engine turbine 66 which are disposed at the same or greater diameter as the plug. No exhaust gas flow is carried through the hollow center of the plug 21 which is shut off to exhaust gas by the inner circumference of the turbine 66. A supporting structural means upon which the nozzle 20 is constructed is a forward attachment ring 40 which is substantially of the same diameter as the rearward flange 70 on the tailpipe. A second supporting structural means for the nozzle 20 is a more rearward base ring 72 of a suitable size and shape to fit the conical shaped plug 21 at the position at which the base ring 72 is located. The base ring 72, as best shown in FIGS. 8 and 8a, is attached as by a welded construction to nozzle structure, which structure forms substantially flat bottoms 26 of external valleys 25.

From the FIGS. 1, 2, and 8A, the external valleys 25 are seen to comprise means for forming intervening channels 22 with planar channel side walls 24, best shown in FIG. 2. The channels 22 are for channelizing the flow of hot exhaust gases rearward from the nozzle. The plurality of flow channels 22, of which twelve are shown in FIGS. 1, 3, 4, and 8A, for purposes of illustration, are uniformly spaced around the plug 21. It is to be understood that a greater or lesser number of flow channels may be used in such a nozzle.

FIG. 8 best shows the channels 22 from the position at which the exhaust gases (some of which gases are partially illustrated by the rearward extending arrows 23 of FIGS. 1 to 3) approach the nozzle 20 from within the tailpipe 62. The nozzle attachment ring 40 and the flange 70 on the tailpipe may be attached by any suitable clamps 73, or the like, which makes the nozzle detachable.

The valleys 25 between the planar side walls 24 are shown to best advantage in FIGS. 1, 2, 3, 4, and 8. The valley floor 26 extends from near the plug 21 to point positions 27 disposed at the diameter of the attachment ring 40. The valleys 25 at their most rearward positions are of an appreciable width compared to the width of the adjacent channels 22, and the width of these valleys decreases to the points 27 at their most forward position. In the valleys 25 between the planar walls 24 or the channels are a plurality of cross members 28, preferably planar and parallel to one another, disposed in such a manner as to guide air or gas flow passing through the valleys into a non-turbulent flow. These cross members 28 also stiffen the planar walls 24 of the flow channels 22, so that unequal pressures at any time on opposite sides of these channel walls will not collapse them. As best shown in FIG. 8A, the valleys 25 also serve to split the rearward flowing hot engine gases 23 within the nozzle 20 into the various channels 22. As shown in FIG. 12, secondary cold air flow 29, represented by dotted curved lines and arrows obtained externally from around the engine, flows rearward through the valleys 25 in the same general direction as the hot gases 23. This cold air flow 29 is aspirated by the high velocity hot gas flow 23 from the engine.

The direction of the hot gases 31 through the valleys 25 under different conditions of operation constitute forward directed hot gases in the direction of the arrows 31 in the valleys. Actually, for the condition of operation shown in FIG. 1, these gases 31 do not flow; and, instead, secondary cold air 29, as shown in FIG. 12, is aspirated in a direction opposite to that indicated by the arrows 31.

The engine nozzle 20 has an axis of symmetry, represented by the imaginary line 30, with each half of the nozzle 20 on each side of the axis of symmetry 30 having hot gases 31' directed in balanced patterns of the gases 31' on the opposite side of the axis of symmetry 30. The axis of symmetry 30 is best shown in the end view of FIG. 14 of the nozzle 20. This balanced pattern of gases on each side of the axis of symmetry is accomplished by turning vanes 32, (see FIGS. 1 and 14), provided adjacent to the forward end of four of the six valleys on each side of the axis of symmetry 30. The two pairs of outer valleys on each side of the two centrally located valleys have vanes 32 which turn the gases 31' in a plane substantially normal to the axis of symmetry 30 as shown in FIGS. 1 and 14. It is to be understood, however, that the gases 31' from the vanes 32 also are traveling in somewhat a forward direction to create reverse thrust.

The nozzle 20 has gates 34 which form the trailing edge 35 of the planar walls 24 of the channels. These gates 34 are better shown in FIGS. 3 and 4, which show the nozzle 20 with the cross members 28 removed from the valleys 25, and the vanes 32 removed from positions adjacent to the valleys. The gates 34 are centrally disposed around an imaginary axis of rotation 36 about which the gates are operated so as to be positioned as shown in FIG. 4. The actuation of the gates to the FIG. 4 position is accomplished by suitable individual connecting rods 37 for each channel which pass through holes 38 provided in the nozzle assembly above the gates 34 for each channel. As shown in FIG. 8, the rods 37 may extend within the cowling 63 through suitable holes 74 provided through the cowling from where the rods extend forward between, or through, braces 64 to suitable actuation means. The gates 34, in the actuated position of FIG. 4, close both the rearward ends of the valleys 25 and the channels 22. In this position they also provide an opening 39 in the planar side wall 24 of the channel 22.

The size of the opening 39 in the side wall 24 of the channel must be such that the effective forward exit area of the nozzle 20 with the gates 34 in the reverse thrust position, as shown in FIG. 4, is equal to the effective rearward exit area of the nozzle with the gates 34 in the forward thrust position, as shown in FIGS. 1 and 3. In other words, the flow chambers 22 and reverse gas flow valleys 25 must have equal capacity to carry gas flow when the nozzle is set for either forward or reverse gas flow.

For being in the position of FIG. 3, the gates 34 are manufactured in such a manner as to be aerodynamically smooth inside and outside, and are also shaped and positioned to be effective in forming the trailing edge portion 35 of the channel 22. FIG. 5 is a fragmentary section view of one pair of typical channel trailing edges 41 and 42, shown in FIG. 3, in which the detail of the gates 34 is more clearly depicted. The gates operate about the axes of rotation 36, (see FIG. 6), by having the gates suitably mounted in a journal, or the like, attached in fixed position to the nozzle assembly on the periphery of each gate coincident with its axis 36. This may be accomplished by any simple journaled or pivoted mounting means 43, see FIGS. 5 and 7, and therefore minor details of this construction are not here shown. The individual gate connecting rod 37 for each channel 22 extends from a position forward and peripheral of the nozzle, and is centrally disposed above its channel, terminating in a wide flat portion 44 extending toward each of the channel planar walls 24, as shown in FIGS. 5 and 7. Extending inward from positions of the channel planar walls 24, and from the gate structure aligned with these walls are flat wing-shaped cranks 45 which are an integral part of the gates 34. These wing-shaped cranks 45 and the flat portion 44 of the connecting rod 37 each lie in the same plane. Two linkages 46, held to the flat connecting rod portion 44 and individual wing-shaped cranks 45 by connecting rod pins 47 and crank pins 48, are provided to transmit rod movement to the gates 34. Shown in FIG. 6, which is a cross section view of the channel shown in FIG. 5, is one of two lower linkages 49 provided on the opposite side of the connecting rod flat portion 44 and the wing-shaped crank 45. The lower linkages 49 are also attached to the pins 47 and 48. The linkages, rod and gate wing cranks are conveniently contained in a chamber 50 provided within the nozzle assembly 20 above each flow channel 22.

FIG. 7 shows the two individual gates 34 of FIG. 5 in an actuated position. The plurality of gates in an actuated position are shown in FIG. 4. This position is obtained by drawing the connecting rod 37 forward by a suitable source of power. The rod attached linkages 46 displace the wing cranks 45 and the attached integral surfaces of the gates which form a part of the planar side walls 24. As shown in FIG. 4, the hot gases 31 from the openings 39 are then directed by the gates 34 up the valleys 25 between the channels 22.

FIG. 8 shows a cross-section view, taken along the section line 8—8 of FIG. 8A, in which the valley bottom 26 of a valley such as 25 is clearly shown in a side view. The valley cross members 28 are shown substantially parallel to one another and to the valley bottom 26. The arrows 31' represent the direction which the hot gases would take as they pass up one of the plurality of valleys 25 if the gates 34 were in an actuated position for directing forward movement of these gases and a reverse thrust with respect to the ordinary forward thrust of the engine. The arrows 31' represent reverse hot gas flow as it would be somewhat deflected by turning vanes 32 as they are shown in FIGS. 1, 2, and 14.

FIGS. 9 and 10 show a fragmentary schematic sketch of the nozzle assembly 20 in a "top" and "side" view, respectively, with respect to one channel 22 when the gates 34 are centrally mounted at the pivots 43 on the axis 36, as best shown in FIGS. 5 and 6. The gates 34, FIGS. 9 and 10, are shown actuated in the position of FIG. 4, with the tips 51 of two pairs of gates 34 meeting in a forward position behind the valleys 25, as shown by phantom line representation of the gates 34 in an actuated position in FIG. 9. The hot engine gases 31 then are directed up the valleys 25 in a pattern such as shown by the gas flow arrow representation 31 in FIG. 9.

FIG. 11 shows a fragmentary schematic "top" view very much like the "top" view of FIG. 9 in which the gates 34 are centrally mounted, as best shown in FIG. 9. However, the gates 34' of FIG. 11 comprise an optional embodiment and are actuated in a different manner from the gates of FIG. 9. The tips 51' of the two pairs of gates 34' meet in a rearward position behind the valleys 25' when they are in an actuated position. This position for actuation of the centrally mounted gates 34' is shown by phantom line representation of the gates 34" in an actuated position. The hot engine gases 31a are then directed up the valleys 25' in a turning pattern such as shown by the gas flow arrow representation 31a in FIG. 11.

FIGS. 12 and 13 show schematic representations of the nozzle assembly attached to a jet engine 52 having the engine base plug 21 as it is also numbered 21 in FIGS. 1 to 4 and FIGS. 8 and 14. The secondary cold air flow represented by the dotted line arrows 29 in FIG. 12 is shown for the nozzle assembly 20 with the gates 34 in the position shown in FIGS. 1 and 3. The secondary cold air flow 29 is aspirated by the hot engine gases 23 so as to be drawn rearward down the valleys 25 substantially parallel to the valley floor 26 as this cold air flow passes between the valley cross members 28, as shown in FIG. 2. This secondary cold air flow 29 follows the pattern shown in FIG. 12 when the hot gases 23 are exhausted for forward thrust, as shown in FIGS. 1, 2, and 3. FIG. 13 shows for the same forward thrust conditions of operation the primary air flow 53, represented by arrows. The primary air flow 53 is obtained from within the periphery of the jet engine 52, and is directed by the nozzle 20 toward the periphery of this nozzle as shown in FIG. 13.

FIG. 14 shows a schematic rear view of the nozzle assembly taken at line 14—14 in FIG. 4 when the gates 34 are in the position shown in FIG. 4. FIG. 14 shows schematically the pattern of the reverse gas flow 31' when the turning vanes 32 of the nozzle assembly of FIGS. 1 to 14 affect the gas flow 31' so the gas flow is symmetrical about the imaginary axis of symmetry 30. The pattern of the gas flow 31' is substantially normal to the axis of symmetry 30 in either direction. It is to be understood that other patterns may be obtained by different positioning of the turning vanes 32 in other embodiments. The pattern most suitable will depend on the construction of the aircraft, or the like, on which the jet engine is used.

FIGS. 15 and 16 show a fragmentary "top" and "side" view, respectively, of a schematic representation of an optional embodiment of a nozzle assembly 20'. The nozzle assembly 20' has gates 54 which are pivotally mounted as at 55 at their leading edges 56. The gates 54 are separate and not a part of the channel wall 57. The gates 54 are pivoted in pairs at the center of the rearward end of each valley 58 above the engine plug 59. The gates 54' are represented in phantom lines in position for deflecting hot engine gas from a channel such as 60 into each valley such as 58 to produce reverse gas flow and reverse thrust. Suitable structure may be conveniently provided to block off all exits around the gates 54 except toward the valleys 58 so that this embodiment, although it is detached from the channel walls 57, operates as efficiently and effectively as the two embodiments in which the gates 34 are part of the channel wall as shown in FIGS. 9, 10, and 11.

Referring to FIGS. 1 and 15, the comparative cross sectional sizes of the cold flow valley passages 25 and 58, compared to the cross sectional sizes of the hot flow channels 22 and 60, respectively, should be determined experimentally for various nozzle structures of specific size and shape needed. The port, or opening, see FIG. 4, in the channel wall must also be determined experimentally for a specific nozzle assembly. Pivot movements, on the gates such as 34 and 54 for actuation power requirement, and design development to make the movable gate concept of this invention compatible to a particular jet engine are, of course, subject to ordinary designing considerations; and such requirements are not herein discussed, since they do not comprise a part of this invention.

OPERATION

In FIG. 4, individually controlled movement of the connecting rods 37 will direct hot gases in a reverse thrust producing direction up the valleys 25 in the direction of the arrows 31. This results, since the gates 34 are positioned to close the ends of the channels 22 (see FIGS. 1 to 3), and the valleys 25 and open the channel wall openings 39 to permit fluid communication between channels such as 22 and valleys such as 25. The cross members 28 (see FIGS. 1 and 2) in the valleys guide the hot gases and suitably placed turning vanes 32 guide the reverse thrust gas flow 31 into a pattern normal to an axis of symmetry 30, as shown in FIG. 14. This is basically the operation of the reverse thrust positioning of the gates 34 and also the gates 34' and 54 in the two optional embodiments of FIGS. 11 and 15, respectively.

In the forward thrust positioning (see FIGS. 1 to 3) the rearward ends of the valleys 25 are open as are the rearward ends of the channels 22. This permits aspiration of the secondary cold air flow from the exterior of the rocket engine 52 (see FIG. 12) rearward down the valleys, such as 25, by the movement of the hot gases from the hot gas flow channels 22 rearward around the engine plug 21.

A nozzle assembly constructed according to this invention has noise silencing similar to any channelized plug type noise silencing nozzle. Furthermore, the exit gas flow is reversed in the most overall efficient manner by thrust reverser gates such as disclosed in this invention. This device will weigh significantly less than other known thrust reverser devices, since, in the preferred embodiment, it is an integral part of the channelizing structure for the flow of forward thrust gases. It is possible to actuate this device by any known actuating methods, including pneumatic cylinders driven by air bled from the engine, or by any other suitable means for individually controlling the movement of the actuating connecting rods. It is possible to provide for varied control of the net forward thrust of the jet engine to which this structure is attached from full forward thrust to maximum reverse thrust by proportioning the channels in the forward thrust position versus those in the reverse thrust position by separate operation of the connecting rods to the gates used for reversing thrust. This modulating control effect may be accomplished by use of one simple two-position actuator means for each of the gate connecting rods associated with each channel. This avoids the use of a complicated multiple positioning type of actuation system by other thrust reverser devices previously known.

The base, or aft, portion of the engine can be faired into the airplane structure so that the secondary cold air flow which is aspirated by this nozzle assembly is utilized effectively. This invention provides like efficiency and effectiveness with respect to the reverse gas flow path by means of the same fixed fairing surface. Previously-known devices tend to interfere with the secondary flow, or else tend to be excessively heavy, bulky, or complicated if they are designed to avoid interference with the secondary flow. These previously-known devices ordinarily require an adjustable base fairing to provide for access to rearward moving gas flow during actuation of the thrust reverser.

The silencing features and other advantages of a channelized silencing nozzle of this type are preserved during reverse thrust operation of the illustrated device. The reverse gas flow issues from as many separate channels in the reversing operation as in the forward operation. Therefore, the silencing, which is a function of the gas exit pattern, is maintained. The very quickly diffusing jet gas flow resulting from such an exit pattern in the reverse thrust position produces only relatively low jet velocities and temperatures at short distances from the nozzle exits. Thus, there is a consequent lesser chance of heating adjacent aircraft structure unduly by the hot exhaust gases, or of picking up debris from the airport runway due to high velocities of the exhaust gases. Previously-known devices often lost the diffused pattern of the nozzle exits under reverse thrust operation, with a consequent loss of maximum silencing and other advantages of a diffused reverse gas pattern.

The radial pattern of reverse gas flow may be controlled in this device to prevent impingement of the reverse gas flow on adjacent surfaces by use of fixed (non-actuated) surfaces such as turning vanes. This eliminates the need for providing the reverse flow exit patterns desired.

The flow turning angle is constant at whatever amount of total reverse gas flow is desired at any particular time. However, the total reverse thrust can be varied over a wide range from a minimum to a maximum, as desired by the operator at any time, regardless of the jet engine power setting, by setting one or all of the pairs of gates in non-reverse thrust or reverse thrust positions. Previously-known devices have caused a variation in total flow turning angle as a function of engine power setting; and, thus, at a low jet engine power setting, a desired magnitude of reverse thrust was therefore not made available by these devices.

This invention is not to be limited to the specific embodiments shown in the drawings and described in the description, which are presented by way of example and not of limitation, but only in accordance with the appended claims.

I claim:

1. A combined thrust reversal and sound reduction nozzle for attachment to the tail pipe of a jet engine which nozzle is positioned to the rear of said tail pipe so as to pass through said nozzle, exhaust gases flowing rearward of said jet engine, said nozzle having a longitudinal central axis in alignment with the longitudinal center of said tail pipe, said tail pipe having a central plug covering the central area of said tail pipe, said central plug being so disposed and arranged so as to become successively smaller and terminate in a point rearward of the exhaust position of said tail pipe, said nozzle comprising: radial wall structure uniformly disposed and arranged about said central plug so as to form a circumferential array of a plurality of individual interior radial exhaust channels arranged about said plug and extending in a direction rearward from the exhaust position of said tail pipe toward the point of said plug, said wall structure which forms said interior exhaust channels also forming exterior radial intervening valleys on said nozzle, individual intervening valleys being formed in said nozzle exterior between each two nearest adjacent interior channels; a plurality of hinged pairs of gates, there being a pair of gates provided for each of said interior exhaust channels, said gates being disposed substantially radially and forming a portion of the rearward end of said exhaust channels; and control means for moving said hinged gates about their respective hinges so as to substantially block by means of said gates, said interior exhaust channels and said exterior intervening valleys in such a manner so as to divert exhaust gases normally flowing in a direction rearward from the exhaust exit of said interior exhaust channels into directions toward and around the engine and tail pipe through said intervening exterior valleys on said nozzle, thereby providing reverse thrust operation of said jet engine nozzle due to the changed direction of said exhaust gases.

2. A combined thrust reversal and sound reduction nozzle for attachment to the rear end of the tail pipe of a jet engine and adapted to receive exhaust gases from the jet engine from the tail pipe and pass them rearwardly to the atmosphere, said nozzle having a central axis aligned with the longitudinal axis of said tail pipe and having a central plug arranged along said central axis, a plurality of individual radial channels arranged about said plug and extending in a rearward direction so as to receive exhaust gas flow from the tail pipe and convey it rearwardly, a plurality of radial valleys arranged adjacent individual channels, a plurality of movable substantially radially disposed gates forming a portion of the ends of respective ones of said channels, means for moving said gates into blocking and unblocking position at the rear of said channels and valleys, the movement of said gates into the blocking position providing exit means for the respective channels to the respective valleys, whereby the direction of gas flow is changed to a forward direction in said valleys to produce reversed thrust.

3. Nozzle apparatus for a jet engine for reversing exit gas flow and reducing sound from said jet engine comprising a channelized plug type nozzle having spaced exit gas flow channels and intervening valleys disposed between adjacent pairs of said exit gas flow channels, said channels and valleys being radically disposed around a plug and a plurality of hinged pairs of gates equal in number to said exit as flow channels, said gates forming a portion of the walls defining said gas flow channels, and means for moving said hinged pairs of gates at their respective hinges so as to substantially block the rear of said exit gas flow channels and the rear of said valleys in such a manner as to divert the normally rearward directed exit gases in a forward direction through said intervening valleys, thereby providing reverse thrust operation of said jet engine nozzle.

4. Apparatus according to claim 3 in which each of said valleys is provided with a plurality of substantially parallel cross members in each valley to direct said exit gases through each of said valleys in a non-turbulent flow when said hinged gates are positioned to provide reverse thrust operation of said jet engine nozzle.

5. Apparatus according to claim 3 in which said valleys have greater depth at the most rearward position of each of said valleys than at the lesser rearward positions of said valleys.

6. Apparatus according to claim 3 in which each of said gates is hinged at the centers of said gates.

References Cited by the Examiner

UNITED STATES PATENTS

| | | | |
|---|---|---|---|
| 340,237 | 4/86 | Nagel et al. | 60—35.54 |
| 2,510,506 | 6/50 | Lindhagen et al. | 60—35.6 |
| 2,848,867 | 8/58 | Hausmann. | |
| 2,886,946 | 5/59 | Parker | 60—35.54 |
| 2,940,252 | 6/60 | Reinhart | 60—35.54 |
| 2,955,417 | 10/60 | Brown | 60—35.54 |
| 3,113,428 | 12/63 | Colley et al. | 60—35.54 |

FOREIGN PATENTS 103,325  1/17  Great Britain.

OTHER REFERENCES

F. B. Greatrex: Anglo-American Lecture, "Reduction of Jet Noise"—Flight Magazine, July 8, 1955, vol. 68, No. 2424, pages 57–60.

H. W. Withington: "Jet Noise Can Be Cut," Aviation Age Magazine—April 1956, vol. 25, No. 4, pages 48–53.

SAMUEL LEVINE, *Primary Examiner.*

ABRAM BLUM, JULIUS E. WEST, *Examiners.*